March 10, 1964

M. D. TYLER 3,124,238

BELT CONVEYORS

Filed April 28, 1960

INVENTOR.
Merle D. Tyler
BY
McGrew and Edwards
ATTORNEYS

March 10, 1964　　　M. D. TYLER　　　3,124,238
BELT CONVEYORS

Filed April 28, 1960　　　2 Sheets-Sheet 2

INVENTOR.
Merle D. Tyler
BY
McGrew and Edwards
ATTORNEYS

United States Patent Office 3,124,238
Patented Mar. 10, 1964

3,124,238
BELT CONVEYORS
Merle D. Tyler, Denver, Colo., assignor to Hughes-Tyler Manufacturing Co., Denver, Colo., a corporation of Colorado
Filed Apr. 28, 1960, Ser. No. 25,293
9 Claims. (Cl. 198—192)

This invention relates to belt conveying apparatus and the idlers which are arranged to support a conveyor belt along its length.

Troughed belt conveyors are very common means for transporting particular materials over distances which range from short to extremely long distances of many miles. In such a construction, a flexible belt is supported on idlers or supporting members spaced along the path of belt travel. These idlers rotate with the belt and, also, provide means for troughing the belt in its run at least along the upper or carrying stretch of an endless belt. The belt running over the idlers causes them to rotate. Since most such material being conveyed is of a particulate nature, it is dusty or muddy when wet. Thus these idlers operate under extreme operating conditions. Many different types of idlers have been proposed, ranging from rigid idlers, a series of which are laterally mounted under the belt to support such belt in a trough, to spring idlers supported by its ends for rotation as the belt travels over the idler. In a system utilizing a flexible string of rollers for supporting a belt, it is obvious that there must be reverse bending of at least some portion of the system supporting the rollers since these idlers hang in a catenary type curve. Rollers mounted on cables strung across the conveyor framework have been proposed, but under heavy duty the continuous reverse flexing of the cable causes it to fail.

According to the present invention, I have provided a simplified articulate idler arranged to be suspended from its ends forming a catenary type curve and arranged to support a troughed conveyor belt passing over it. The idler includes shock absorbing means to relieve the idler of stresses from material bouncing on the belt conveyor. The invention furthermore includes a light-weight highly usable framework for supporting a belt conveyor along its route.

Included among the objects and advantages of the present invention is a simplified articulate idler for a belt conveyor which provides simplified means for supporting a continuous, suspended idler in a catenary curve. The invention provides, furthermore, a shock absorbing means for absorbing shock produced by a supported belt and its carried load. The idler of the invention is simply and easily assembled or disassembled for easy maintenance and control of the belt conveyor. The invention, furthermore, provides a strong, light conveyor framework for supporting idlers in a belt conveyor system.

These and other objects and advantages of the invention may be readily ascertained by referring to the following description and appended illustrations in which.

Figure 1:
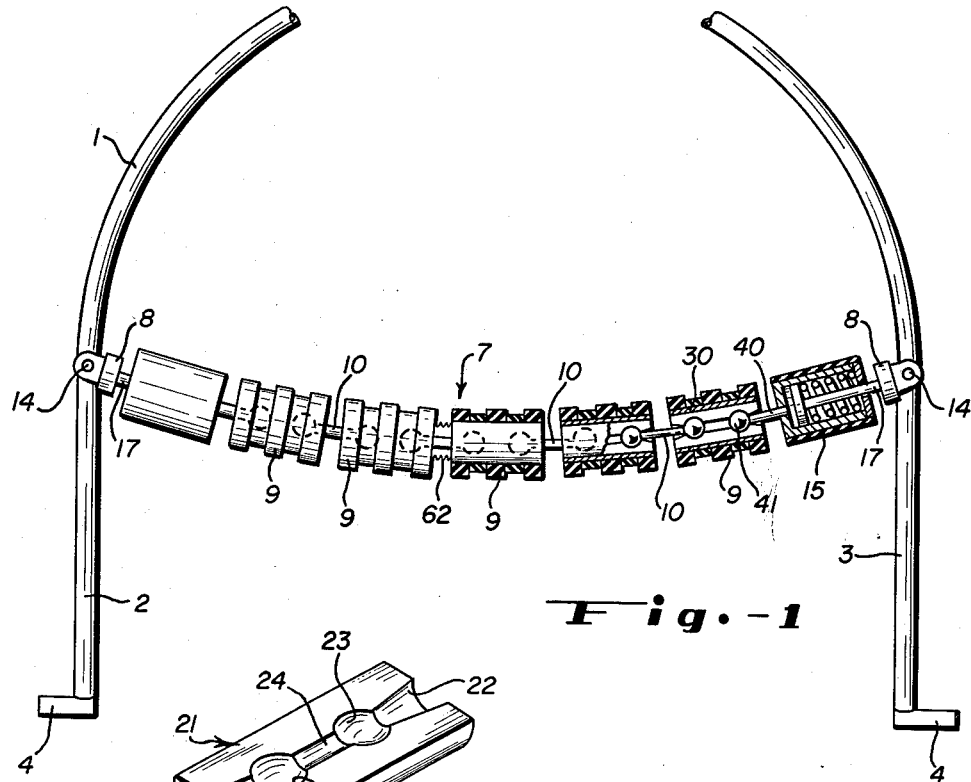
FIG. 1 is a side elevational view, in partial section, of a support and suspended articulate belt conveyor idler according to the invention.

In the device illustrated in FIG. 1, a tubular framework member 1 is provided with upright legs 2 and 3, to the ends of which are secured feet or pad members 4. The member 1 is of a general U-shaped configuration providing means for supporting a conveyor belt idler shown generally by numeral 7. The idler troughs and supports a belt and is mounted on shafts 17 in journals 8 at its ends, and the journals 8 are pivotally connected to the upright 1 by means of bolts 14.

The idler as illustrated in FIG. 1 comprises a series of five rollers 9 interconnected by dumbbell-shaped links 10, rollers varying in number depending on the width of the belt supported. The construction of the idlers is detailed below. The two end rollers of the series are secured to shock absorber apparatus 15 which in turn is journaled by means of shaft 17 into the journal member 8.

Figure 2:
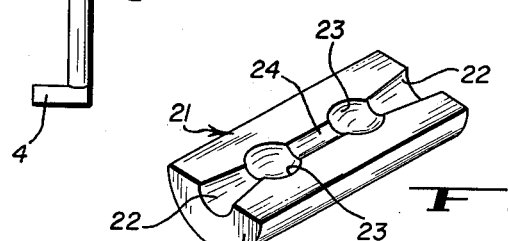
FIG. 2 is a perspective view of a portion of an idler section showing the internal construction thereof.
Figure 4:
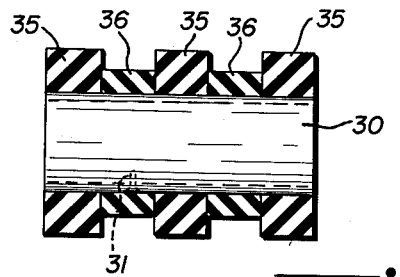
FIG. 4 is a partial sectional elevational view of an idler according to the invention.
Figure 3:
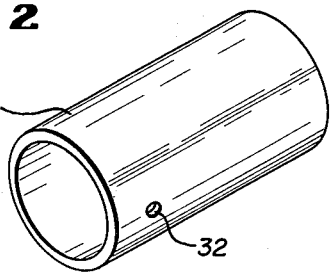
FIG. 3 illustrates a sleeve in perspective view which is arranged to hold a belt holding roller together in forming an idler.

Each pulley or roller member is formed of two cylinder halves 20, a half is illustrated in detail in FIG. 2, which are identical and may be placed face to face along a planar face 21 which bisects the cylinder along its axial extent. Each half, also, contains a groove which includes two outwardly flared ends 22 at each end of the member joining separate hemispherical depressions 23. These depressions 23 are interconnected with the outwardly flared grooves 22. In one form, the two hemispherical depressions 23 are interconnected by means of a passage 24. When in assembled position with two of the halves in face position forming a cylinder, the two hemispherical depressions mate with opposing depressions forming a spherical void interconnecting an outwardly directed conical passage, each having its widest opening at the end of the cylinder.

Each of the dumbbell connector members 10 includes a cylindrical shank portion 11 and a ball portion 12 at each end thereof secured together as an integral unit. The ball freely fits the depressions 23 so that when the two halves are joined together the ball is free to move in its enclosing spherical recess. The outwardly flared grooves 22 provide limited swivel movement of the dumbbell-shaped member when placed between the two halves.

A sleeve 30 is placed over two mating halves in joined position to form a cylinder in assembled position with the dumbbell connectors mounted therein. To provide a positive hold of the sleeve on the cylindrical members a set screw 31 may be threaded into one of the halves through opening 32 in the sleeve. By thus fastening to one of the halves the other half must be maintained in position by means of the dumbbell connectors. A series of rubber or other resilient material rings 35 are placed over the sleeve 30 to provide a resilient surface for the belt to ride on, and the rings 35 may be spaced apart by smaller rings 36 where desired.

Figure 5:
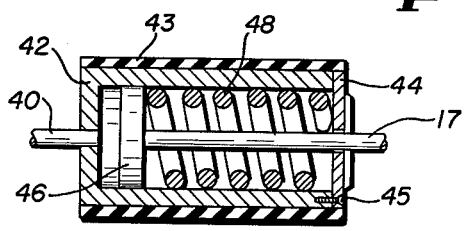
FIG. 5 is a cross-sectional side elevational view of a shock absorbing mechanism according to the invention.

Each free end of a series of connected idlers is provided with a connector 40 which has a single ball 41 secured thereto. The opposite end of the connector is affixed to a cup-shaped member 42, detailed in FIG. 5. The cup-shaped member includes a resilient sleeve 43 mounted thereover to provide for running operation of a belt thereon. The cup-shaped member is enclosed by a cap or cover 44 secured in place by a plurality of screws 45 circumferentially spaced around the cover 44. A piston 46 is freely slidably mounted therein, and a shaft 17 is interconnected for movement with the piston 46. A helical spring 48 is mounted between the piston and the cover 44 to provide a shock absorber for the assembly. As explained above the shaft 17 is journaled for rotation in the journal housing 8.

Figures 6, 7:
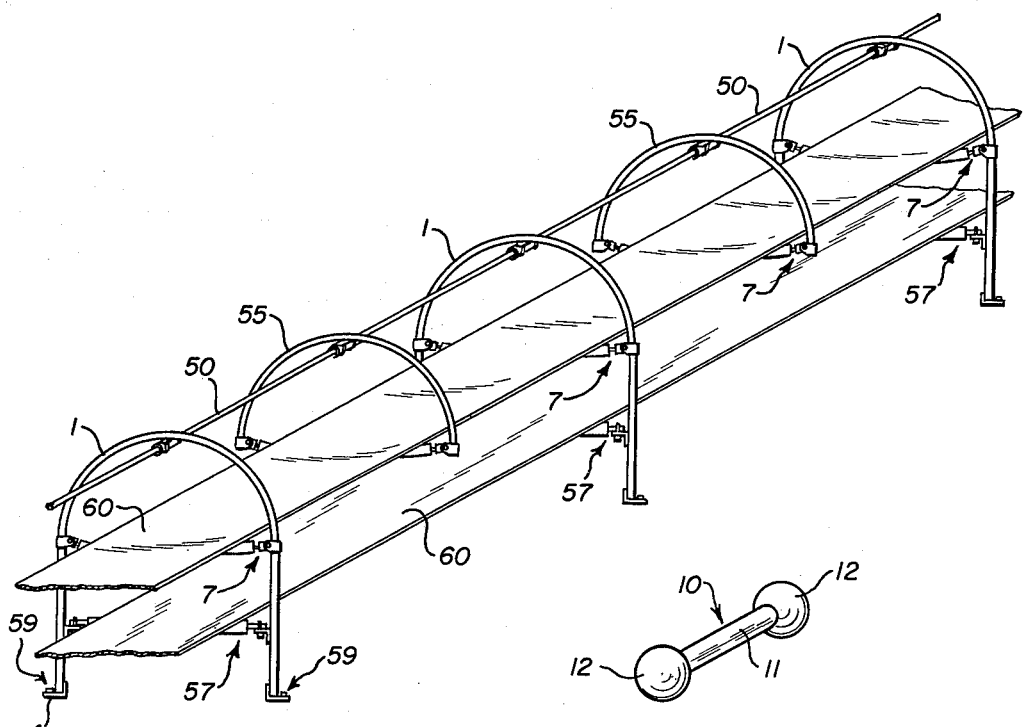
FIG. 6 is a perspective view of a connector unit according to the invention.
FIG. 7 is a view of a portion of an assembled unit according to the invention.
Figure 8:
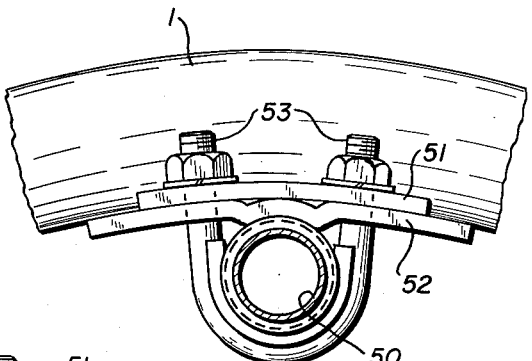
FIG. 8 is an elevational view of a securing assembly for the framework according to the invention.
Figure 9:
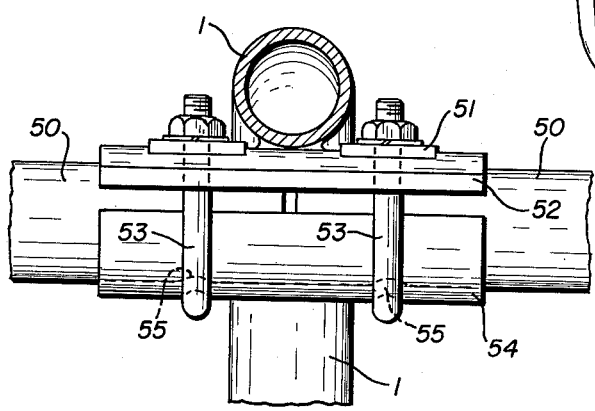
FIG. 9 is a side view of device of FIG. 8, in partial section.

The framework illustrated in FIG. 7 includes a plurality of the U-shaped frames 1 spacedly positioned along a line of travel of travel for a belt. The circular top portions of the U-shaped members are interconnected to an elongated tubular support member 50 which is secured to the U-shaped member by means of U-bolts shown in detail in FIGS. 8 and 9.

The clamp illustrated includes a plate 52 formed to fit the inner surface of the member 1, and this plate is welded or otherwise secured to the member 1. The tube 50 is grooved externally adjacent each end to mate with an indented plate 54. The arcuate plate 54 includes indents 55 which register with grooves in the tube ends. U-bolt assemblies 53 securely hold the tubes in position. Thus a light-weight very strong framework is provided for a belt conveyor. Such a framework is rigid enough to carry heavy loads without undue vibration, and also provides means for economically covering the belt for inclement weather.

In certain instances it may be desirable to provide additional support for stretches of the belt, in other words additional idlers, but, without the requirement of additional framework. For this case there is provided a short, arcuate member 55 which is arranged to be mounted between two upright U-shaped members 1 and suspended on the tubular framework member 50. The return stretch of the belt 60 is placed over return idlers 57 which may be the same as the idlers 7 or any desired idler arranged to support the empty belt in its return travel to the point of loading. Since the return stretch of the belt is not under load, fewer idlers are necessary. The feet 4 of the frame member 1 may be secured to a base member by means of bolts 59 or the like forming a rigid assembly.

In assembled position with the uprights secured to a base member and the tubular frame member 50 secured to each of the frame members 1, a very strong and light-weight conveyor belt framework is provided. As previously explained, a simple cover may be provided over the members for covering the conveyor belt system.

In certain instances where extreme dusting conditions exist, an accordion-pleated resilient dust cover 62, shown in FIG. 1, may be provided between various roller elements of the idler. Such accordion or bellows-type seals are well known in the industry and will provide means for preventing dust and dirt from entering the passages in which the dumbbell-shaped member is mounted.

While the invention has been described with reference to a particular embodiment, there is no intent to limit the spirit or scope of the invention to the precise details so set forth except insofar as defined in the following claims.

I claim:

1. An idler for a belt conveyor comprising a series of interconnected rollers arranged to be rotatively suspended so as to hang in an approximate catenary curve for supporting a conveyor belt, each roller including mating grooved halves arranged to provide two spaced recesses in assembled halves with a passage providing external communication with each said recess, a connecting rod pivotally securing said rollers together, each said rod having a bulbous member on each end for riding in said recesses, means for holding the halves together in operative position, and means for suspending said series in a curve from its ends.

2. An idler for a belt conveyor comprising a series of interconnected rollers arranged to be rotatively suspended so as to hang in an approximate catenary curve for supporting a conveyor belt, each roller including mating grooved halves arranged to provide two spaced generally spherical recesses in the halves and an outwardly diverging passage communicating with each said recess, a connecting rod pivotally securing said rollers together, each said rod having a spherical bulb on each end for riding in said spherical recesses, means for holding the halves together in operative position, and means for suspending said series in a curve.

3. A belt conveyor idler comprising a series of articulate rollers endwise joined together and arranged to be suspended from their ends in a generally catenary curve, a bearing set at each end of the series of rollers, each end of said series arranged for journaling in one of said bearing sets, each said bearing set being pivotally mounted from a frame member for supporting said idlers, each said roller including mating grooved halves, a connector member for interconecting adjacent rollers and each including a shank mounted between two bulbous members, the grooves in each roller providing two recesses each arranged for holding one bulbous member of a connector between said halves with said shanks extending beyond said roller, said bulbous members on each connector arranged to pivotally seat in said recesses to thereby articulately join said rollers together, means for securing said halves together, and resilient belt contacting means covering said means.

4. An idler according to claim 3 in which the means for joining the halves is a sleeve.

5. An idler according to claim 3 in which the recesses in each half are shaped to form a spherical void on joining two such halves, and the connectors include a generally spherical bulb.

6. An idler according to claim 3 in which the resilient belt contacting means includes a series of rings arranged with alternately large and small external diameters for forming spaced belt contacting surfaces.

7. A belt conveyor idler comprising a series of articulate rollers endwise joined together, shock absorbing means and suspended bearing sets, said rollers being arranged to be suspended from their ends in a generally catenary curve with each said free end connected to one of said shock absorbing means, each said shock absorbing means being journaled for free rotation in one of said suspended bearing sets, each said bearing set being pivotally mounted from a frame member for supporting said idlers, each said roller including mating grooved halves, a connector for interconnecting adjacent rollers and each including a shank mounted between two bulbous members, the grooves providing two recesses each arranged for holding one bulbous member of a connector between said halves with said shanks extending beyond said roller, said bulbous members arranged to pivotally seat in said recesses to thereby articulately join said rollers together, means for securing said halves together, and resilient belt contacting means covering said means.

8. A belt conveyor idler comprising a series of articulate rollers endwise joined together, spring loaded shock absorbing means and suspended bearing sets, said rollers being arranged to be suspended from their free ends in a generally catenary curve, each said free end connected to one of said spring-loaded shock absorbing means, each said shock absorbing means being journaled for free rotation in one of said suspended bearing sets, each said bearing set being pivotally mounted from a frame member for supporting said idler, each said roller including mating grooved halves, a connector for interconnecting adjacent rollers and each including a shank mounted between two spherical members, the grooves providing two spherical recesses in each roller for holding one spherical member of a connector between said halves with said shanks extending beyond said roller, said spherical members arranged to pivotally seat in said recesses to thereby articulately join said rollers together, sleeve means for securing said halves together in a cylindrical arrangement, and resilient belt contacting means about said sleeve means.

9. An idler for a belt conveyor comprising a series of interconnected cylindrical rollers arranged to be rotatively suspended so as to hang in an approximate catenary curve for supporting a conveyor belt, each roller including mating grooved halves arranged to provide two spaced generally spherical recesses in the assembled halves with an outwardly diverging passage communicating with each said recess, a dumbbell-shaped connecting rod securing assembled rollers together with a spherical bulb on each end thereof seating in said spherical recesses, sleeve means arranged in covering relation of said halves along a longitudinal direction for holding the halves together in operative position, and means for rotatively suspending said series in a curve.

References Cited in the file of this patent

UNITED STATES PATENTS

| | | |
|---|---|---|
| 909,833 | Vrooman | Jan. 12, 1909 |
| 2,179,187 | Kendall | Nov. 7, 1939 |
| 2,885,066 | Lo Presti | May 5, 1959 |
| 2,907,448 | Gleeson | Oct. 6, 1959 |

FOREIGN PATENTS

| | | |
|---|---|---|
| 890,337 | France | Feb. 4, 1944 |
| 368,802 | Germany | May 15, 1923 |
| 788,374 | Great Britain | Jan. 2, 1958 |
| 535,658 | Italy | Nov. 16, 1955 |